(12) United States Patent
Yang

(10) Patent No.: US 7,815,156 B2
(45) Date of Patent: Oct. 19, 2010

(54) BICYCLE ACCESSORY DEVICE

(75) Inventor: Morder Yang, Tainan (TW)

(73) Assignee: Giant Manufacturing Co., Ltd., Ta Chia Chen (TW)

( * ) Notice: Subject to any disclaimer, the term of this patent is extended or adjusted under 35 U.S.C. 154(b) by 94 days.

(21) Appl. No.: 12/230,579

(22) Filed: Sep. 2, 2008

(65) Prior Publication Data

US 2010/0051768 A1 Mar. 4, 2010

(51) Int. Cl.
*A47B 96/06* (2006.01)

(52) U.S. Cl. ............ 248/218.4; 248/219.1; 248/220.21; 248/222.14

(58) Field of Classification Search .............. 248/218.4, 248/219.1, 220.21, 222.14, 222.52
See application file for complete search history.

(56) References Cited

U.S. PATENT DOCUMENTS

| | | | | |
|---|---|---|---|---|
| 1,236,960 A * | 8/1917 | McMillan | ................. | 248/219.1 |
| 3,092,407 A * | 6/1963 | Blonder | ....................... | 403/191 |
| 3,650,544 A * | 3/1972 | Cassell | ....................... | 280/293 |
| 3,976,273 A * | 8/1976 | Kussow | ..................... | 248/218.4 |
| 4,174,822 A * | 11/1979 | Larsson | ........................ | 248/75 |
| 5,295,727 A * | 3/1994 | Kao | ........................ | 297/215.14 |
| 5,405,113 A * | 4/1995 | Jaw | ........................... | 248/229.1 |
| 5,596,143 A * | 1/1997 | Hashimoto | .................... | 73/431 |
| 5,704,526 A * | 1/1998 | Kuo | ............................ | 224/425 |
| 5,890,759 A * | 4/1999 | Ross | ..................... | 297/195.13 |
| 6,375,257 B1 * | 4/2002 | Wooding et al. | ............ | 297/162 |
| 6,712,376 B2 * | 3/2004 | Eberhardt et al. | ........... | 280/293 |

* cited by examiner

*Primary Examiner*—Amy J Sterling
(74) *Attorney, Agent, or Firm*—Harness, Dickey & Pierce, P.L.C.

(57) ABSTRACT

A bicycle accessory assembly is mounted to inner and outer tubes of a bicycle frame. The outer tube is sleeved on the inner tube. The bicycle accessory assembly includes a clamp, an accessory, and a fastening unit. The clamp includes a sleeve portion sleeved on the outer tube, and first and second clamp ears connected respectively to two ends of the sleeve portion. The accessory has a connecting portion and an abutment portion. The fastening unit extends through the connecting portion and the first and second clamp ears along an axis. The fastening unit is operable to move the first clamp ear toward and away from the second clamp ear. The axis is oriented such that rotation of the accessory about the axis is prevented as a result of contact of the abutment portion with the inner tube and a top end of the inner tube.

20 Claims, 12 Drawing Sheets

BICYCLE ACCESSORY DEVICE

BACKGROUND OF THE INVENTION

1. Field of the Invention

This invention relates to a bicycle, and more particularly to a bicycle accessory device that includes an accessory (such as a tail lamp, a mudguard, or a rear carrier rack), a clamp, and a fastening unit cooperating with the clamp to lock the accessory on a bicycle frame.

2. Description of the Related Art

Referring to FIG. 1, a tail lamp 111 is mounted on a seat tube 11 by a clamp 112. Referring to FIG. 2, a mudguard 121 is mounted on a seat tube 12 by a clamp 122. When either of the clamps 112, 122 is loosened slightly from the seat tube 11, 12 after a period of use, a corresponding one of the tail lamp 111 and the mudguard 121 moves or pivots relative to the seat tube 11, 12.

Referring to FIG. 3, a rear carrier rack 131 is mounted on a bicycle frame 13 by two lock bolts 132. When the rear carrier rack 131 is assembled to the seat tube 13, damage may be caused to the outer surface of the seat tube 13 by the lock bolts 132, thereby affecting adversely the appearance of the seat tube 13.

SUMMARY OF THE INVENTION

The object of this invention is to provide a bicycle accessory assembly that can overcome the above-mentioned disadvantages associated with the prior art.

Accordingly, the bicycle accessory assembly of this invention is mounted to inner and outer tubes of a bicycle frame. The outer tube is sleeved on the inner tube. The bicycle accessory assembly includes a clamp, an accessory, and a fastening unit. The clamp includes a sleeve portion sleeved on the outer tube, and first and second clamp ears connected respectively to two ends of the sleeve portion. The accessory has a connecting portion and an abutment portion. The fastening unit extends through the connecting portion and the first and second clamp ears along an axis. The fastening unit is operable to move the first clamp ear toward and away from the second clamp ear. The abutment portion is in contact with the inner tube and a top end of the outer tube.

Since the clamp is sleeved on the outer tube, and since the abutment portion of the accessory is in contact with the inner tube and the top end of the outer tube, when the clamp is loosened slightly from the outer tube after a period of use, pivoting and moving of the accessory relative to the inner tube can be prevented. Furthermore, when the fastening unit is configured as a lock bolt, it is not in contact with the inner and outer tubes, and, thus, cannot damage the same.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
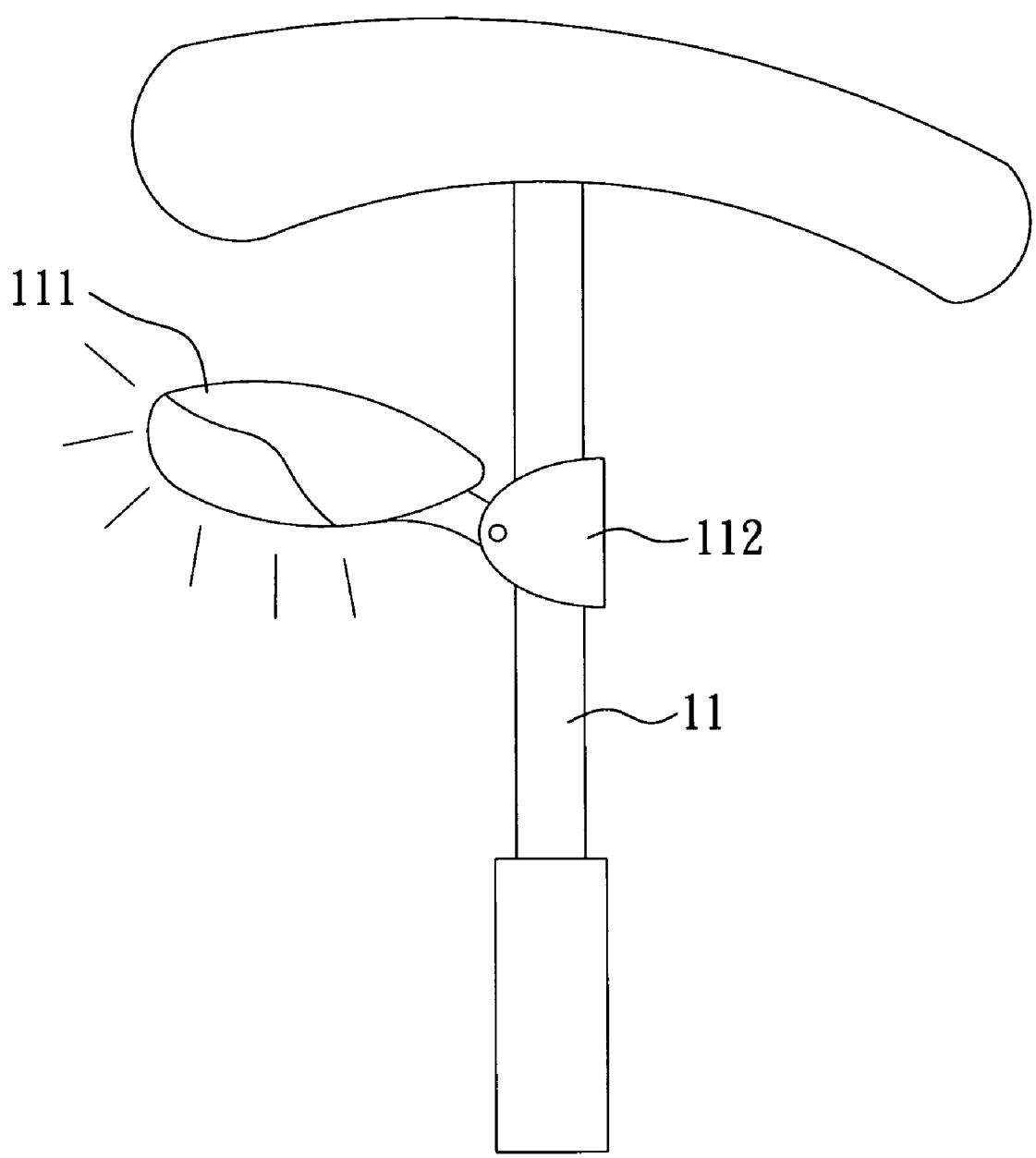
FIG. 1 is a schematic side view of a bicycle tail lamp mounted to a seat tube by a clamp.
Figure 2:
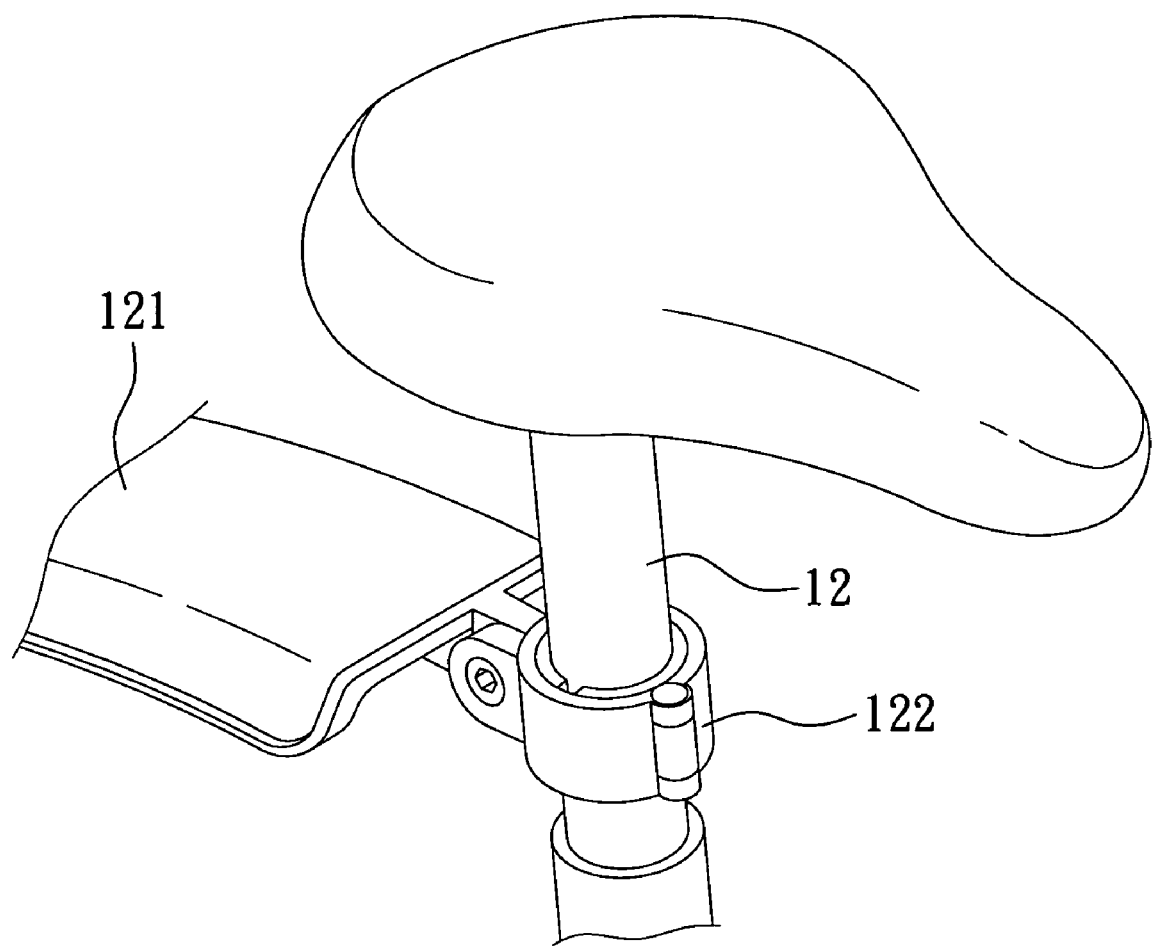
FIG. 2 is a schematic perspective view of a bicycle mudguard mounted to a seat tube by a clamp.
Figure 3:
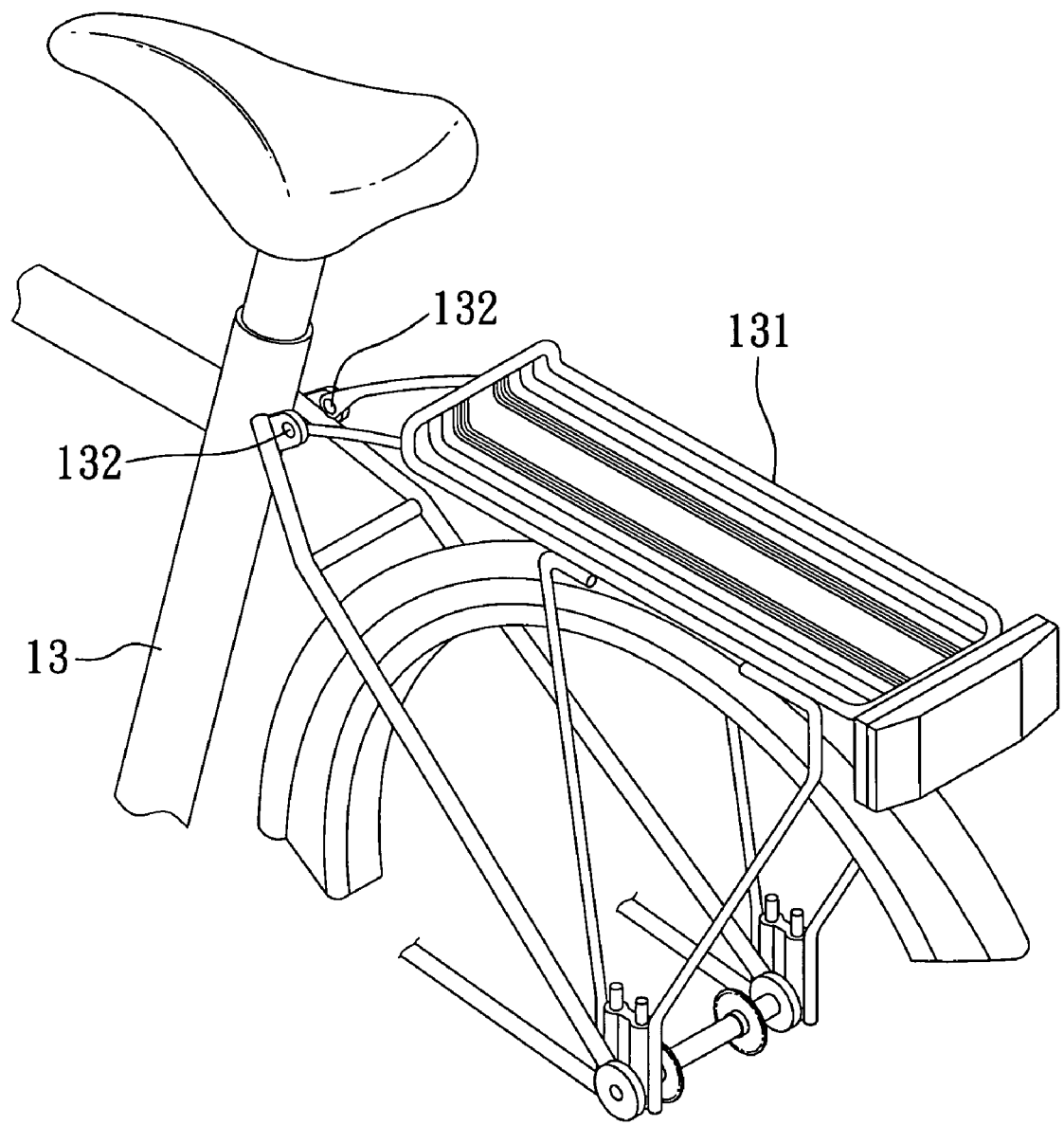
FIG. 3 is a schematic perspective view of a bicycle rear carrier rack mounted to a bicycle frame by two lock bolts.
Figure 4:
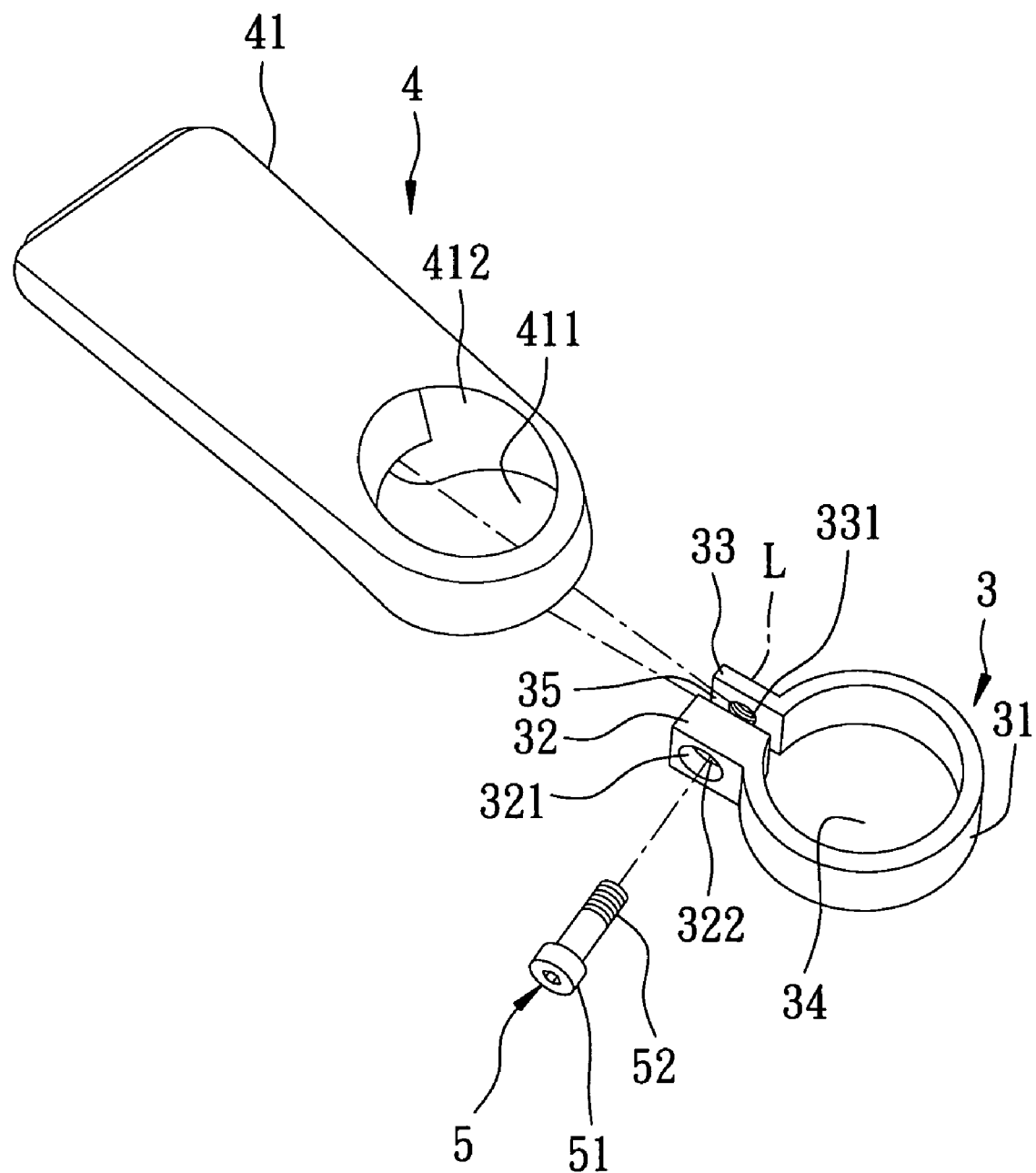
FIG. 4 is an exploded top perspective view of the first preferred embodiment of a bicycle accessory device according to this invention.
Figure 5:
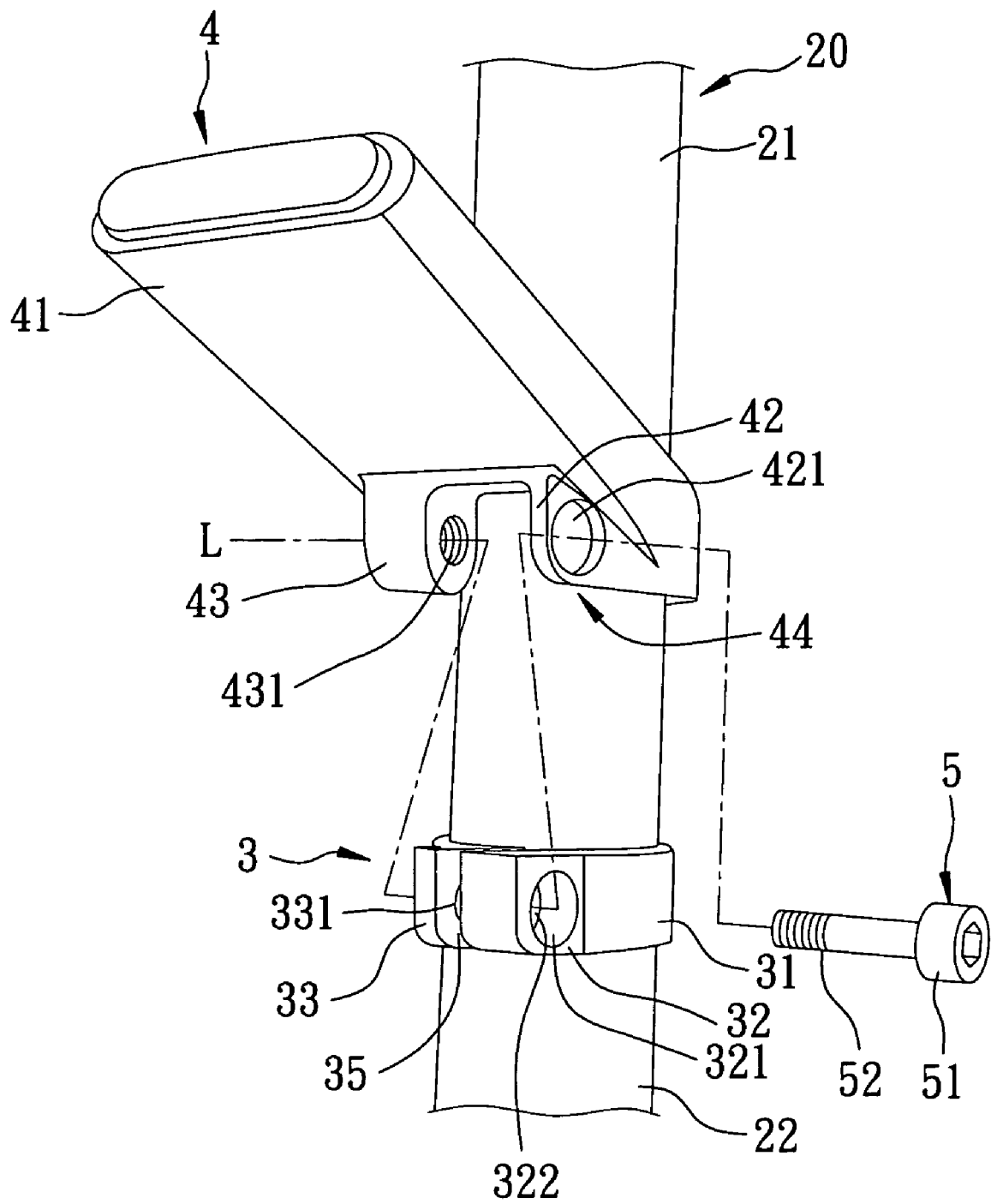
FIG. 5 is an assembled bottom perspective view of the first preferred embodiment mounted to inner and outer tubes.
Figure 6:
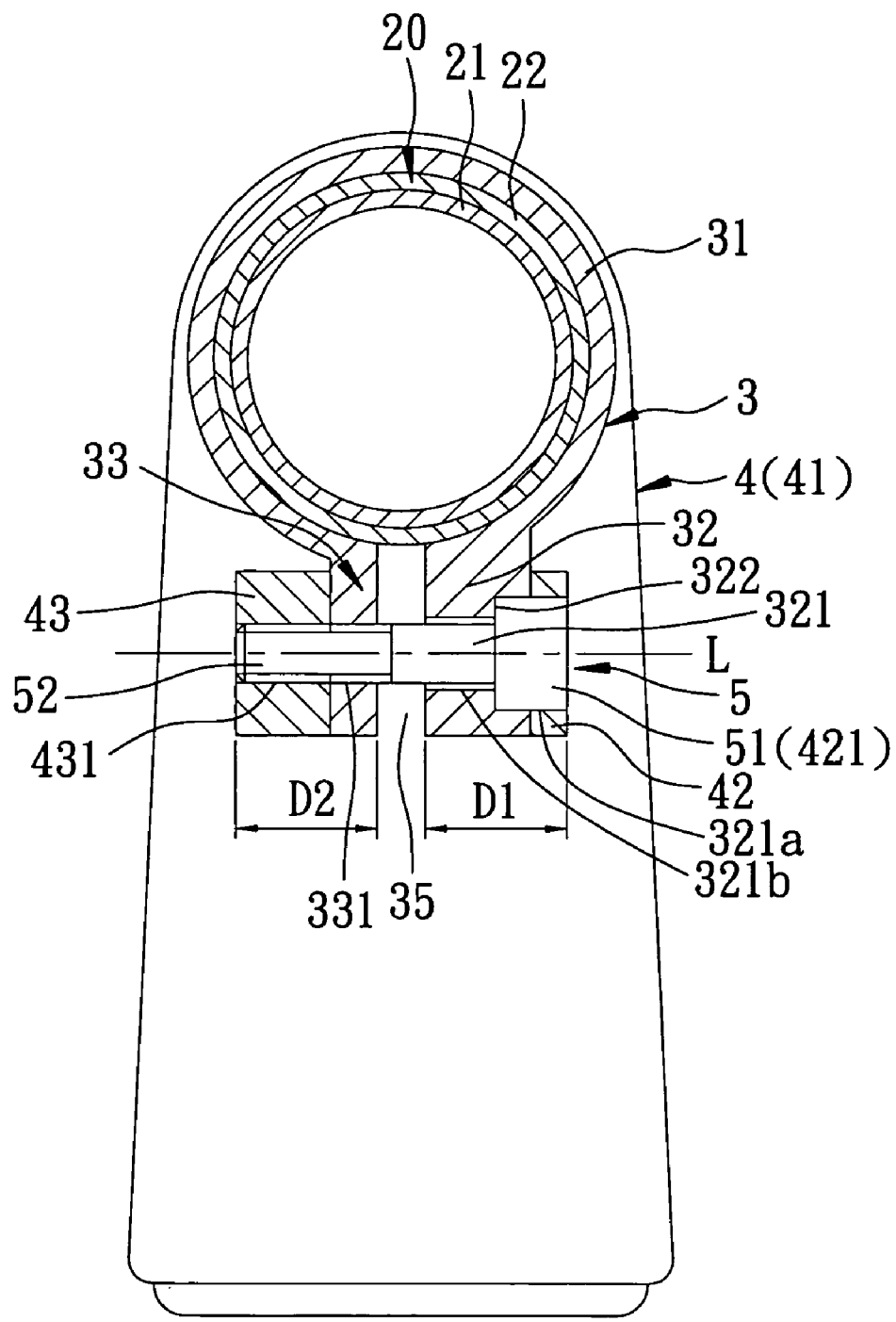
FIG. 6 is a partly sectional view of the first preferred embodiment, and the inner and outer tubes.
Figure 7:
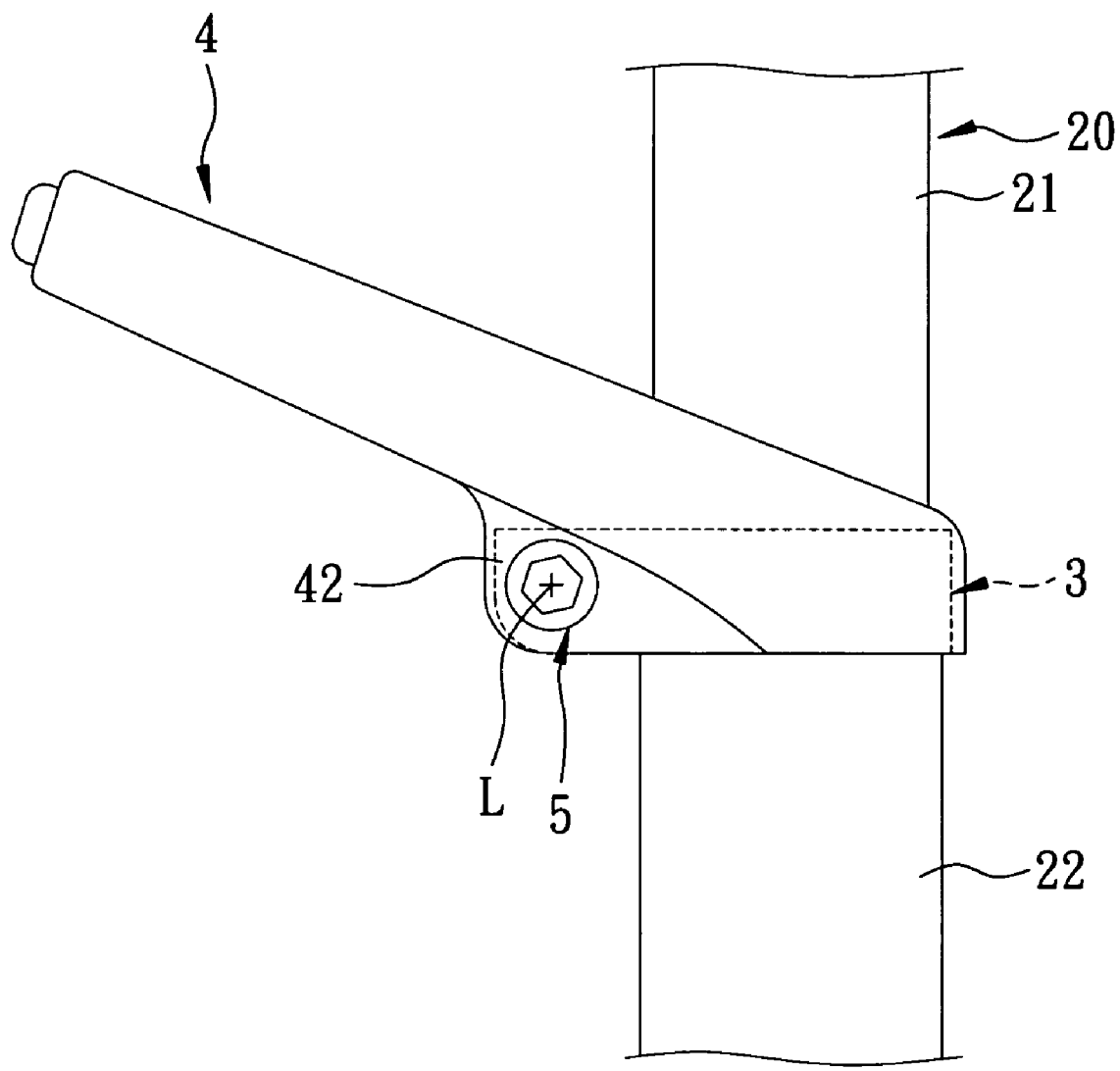
FIG. 7 is a fragmentary schematic side view of the first preferred embodiment, and the inner and outer tubes.

Before the present invention is described in greater detail in connection with the preferred embodiments, it should be noted that similar elements and structures are designated by like reference numerals throughout the entire disclosure.

Referring to FIGS. 4, 5, 6, and 7, the first preferred embodiment of a bicycle accessory device according to this invention is mounted to a seat tube assembly 20 consisting of inner and outer tubes 21, 22. The inner tube 21 has a top end disposed above the outer tube 22 and supporting a seat (not shown) thereon. The bicycle accessory device includes a clamp 3, an accessory 4, and a fastening unit 5.

The clamp 3 includes a sleeve portion 31 sleeved on the outer tube 22 and having two adjacent ends, a first clamp ear 32 connected integrally to one of the ends of the sleeve portion 31, and a second clamp ear 33 connected integrally to the other of the ends of the sleeve portion 31. The sleeve portion 31 defines a tube-engaging hole 34 permitting extension of the outer tube 22 therethrough. The first and second clamp ears 33 define an opening 35 therebetween. The first clamp ear 32 is formed with a pivot hole 321. The second clamp ear 33 is formed with a threaded hole 331 aligned with the pivot hole 321 in the first clamp ear 32 along an axis (L). The pivot hole 321 in the first clamp ear 32 is configured as a counterbore, and has a large-diameter hole portion 321a and a small-diameter hole portion 321b connected to the large-diameter hole portion 321a and having a diameter smaller than that of the large-diameter hole portion 321a to define a shoulder 322 therebetween.

The accessory 4 is configured as a tail lamp, and has a body 41, as well as first and second accessory ears 42, 43. The first and second accessory ears 42, 43 constitute a connecting portion 44 for connection with the clamp 3. The first and second clamp ears 32, 33 are located between the first and second accessory ears 42, 43. The accessory 4 further has a hole 411 defined by an annular inner peripheral portion 412 and permitting the inner tube 21 to extend fittingly therethrough. As such, the annular inner peripheral portion 412 constitutes an abutment portion for contact with the inner tube 31 and a top end of the outer tube 22. The first accessory ear 42 is formed with a pivot hole 421. The second accessory ear 43 is formed with a threaded hole 431. The pivot hole 421 in the first accessory ear 42 and the threaded hole 431 in the second accessory ear 43 are aligned with the pivot hole 321 in the first clamp ear 32 and the threaded hole 331 in the second clamp ear 33 along the axis (L).

In this embodiment, the thickness of the first clamp ear 32 along the axis (L) is larger than that of the second clamp ear 33, and the thickness of the first accessory ear 42 along the axis (L) is smaller than that of the second accessory ear 43. The total thickness (D1) of the first clamp ear 32 and the first accessory ear 42 is the same as the total thickness (D2) of the second clamp ear 33 and the second accessory ear 43 to enhance the appearance of the accessory device.

The fastening unit 5 extends through the first and second clamp ears 32, 33 and the first and second accessory ears 42, 43 along the axis (L) so as to lock the clamp 3 and the accessory 4 on the seat tube assembly 20. The fastening unit 5 has a head 51 disposed within the large-diameter hole portion 321a of the pivot hole 321 in the first clamp ear 32 and abutting against the shoulder 322, and a threaded stem portion 52 extends through the small-diameter hole portion 321b of the pivot hole 321 in the first clamp ear 32 and the pivot hole 421 in the first accessory ear 42 to engage the threaded holes 331, 431 in the second clamp ear 33 and the second accessory ear 43. As such, the fastening unit 5 is operable to move the first and second clamp ears 32, 33 toward and away from each other. The axis (L) is oriented such that rotation of the accessory 4 about the axis (L) is prevented as a result of contact between the abutment portion of the accessory 4 and the inner and outer tubes 21, 22.

In view of the above, when the fastening unit 5 is loosened slightly after a period of use, since the accessory 4 is in contact with the inner tube 21 and a top end of the outer tube 22, pivoting and moving of the accessory 4 relative to the inner and outer tubes 21, 22 can be prevented. Thus, the object of this invention is achieved.

Figure 8:
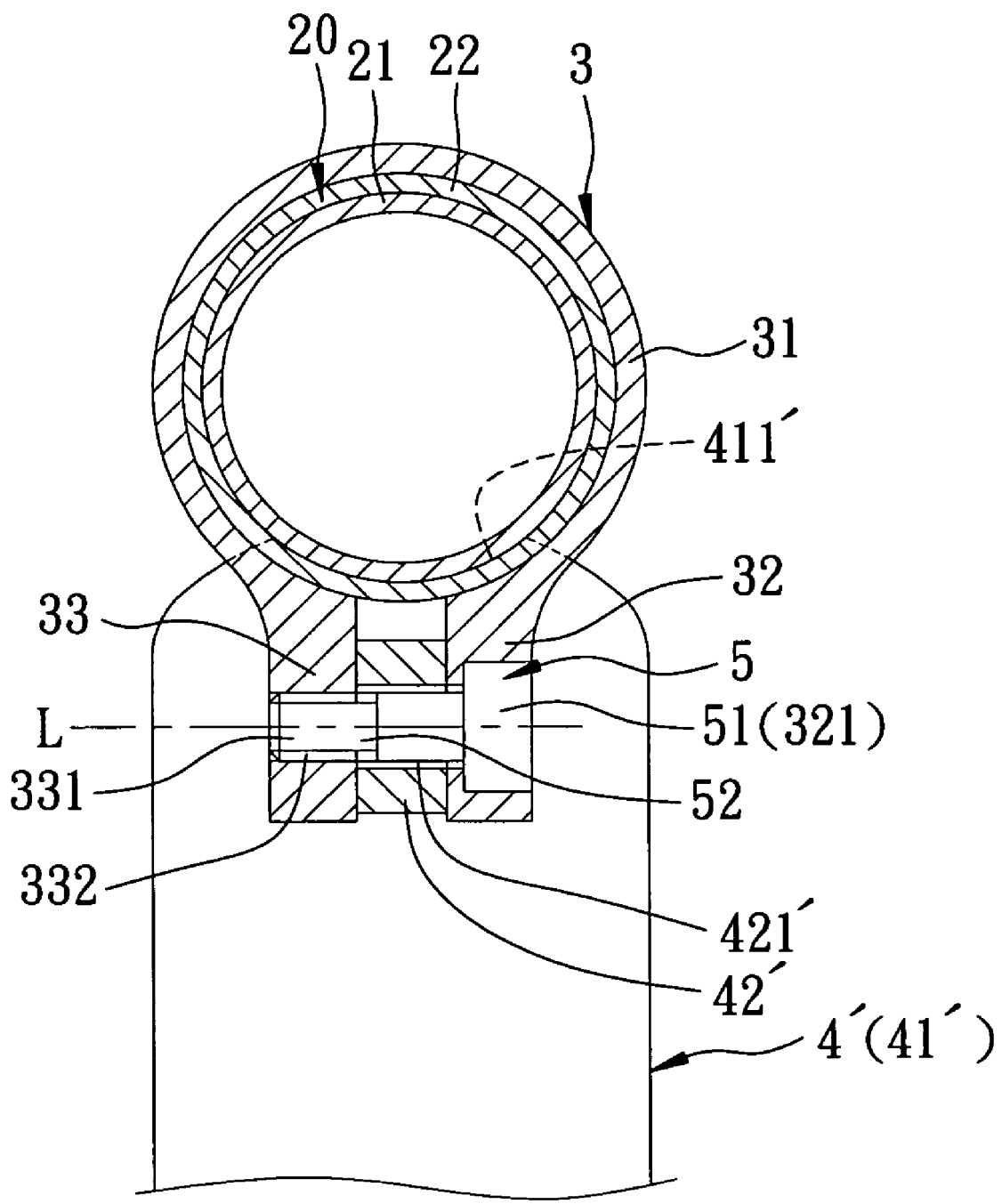
FIG. 8 is a partly sectional view of the second preferred embodiment of a bicycle accessory device according to this invention mounted to inner and outer tubes.
Figure 9:
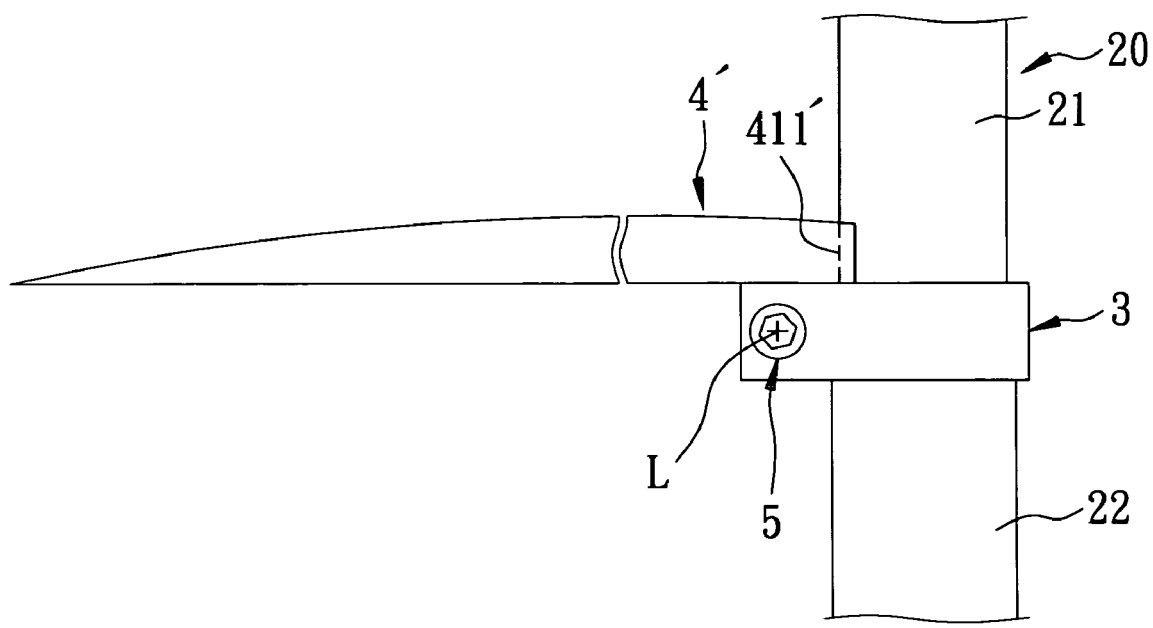
FIG. 9 is a fragmentary side view of the second preferred embodiment, and the inner and outer tubes.
Figure 10:
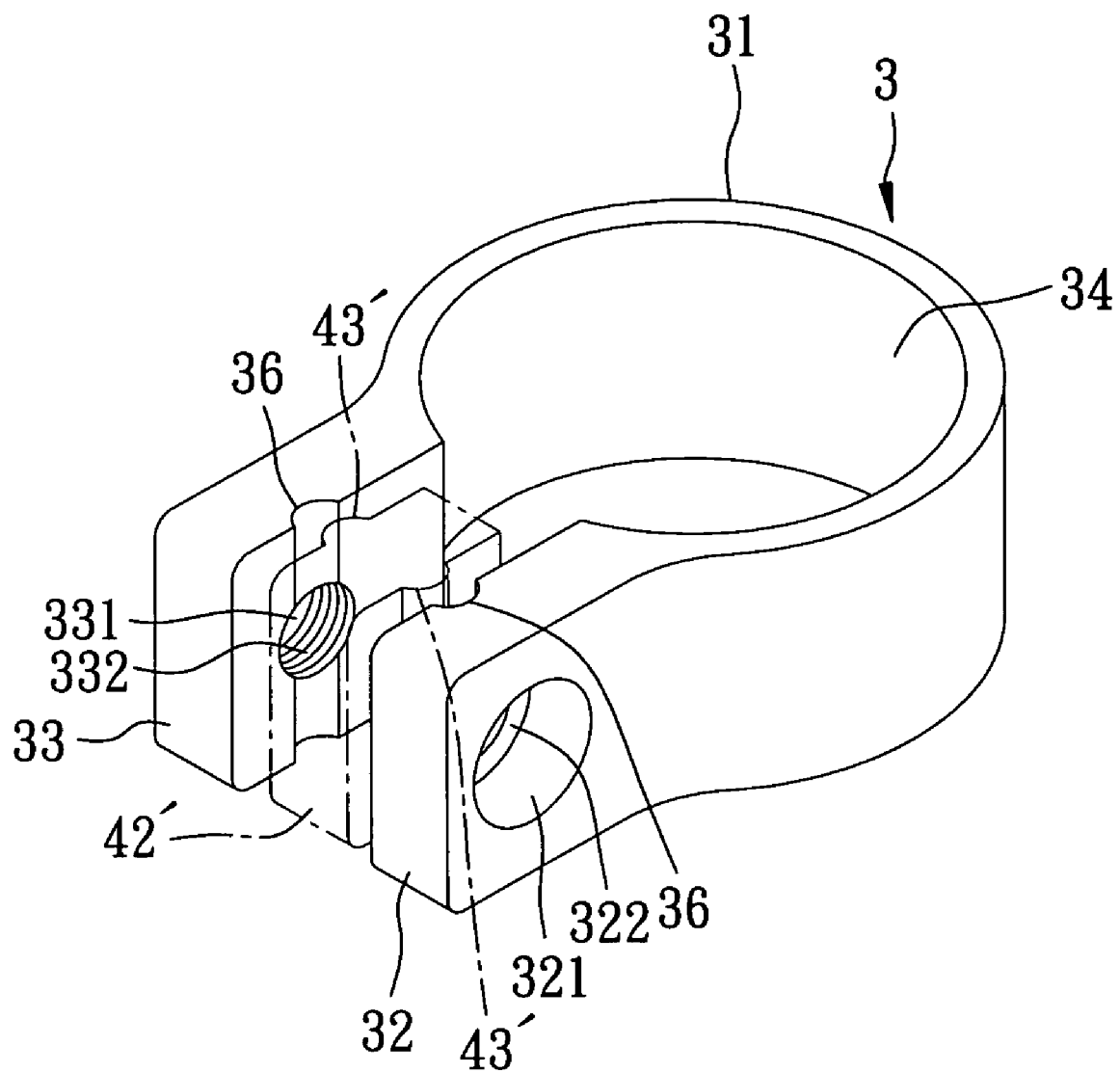
FIG. 10 is a schematic perspective view of a clamp and a connecting portion of an accessory of the second preferred embodiment, illustrating engaging slots and engaging ribs.

FIGS. 8, 9, and 10 show the second preferred embodiment of a bicycle accessory device according to this invention, which is similar in construction to the first preferred embodiment. In this embodiment, the thickness of the first clamp ear 32 along the axis (L) is the same as that of the second clamp air 33. The accessory 4' is configured as a mudguard, and has a body 41', and a connecting portion 42' configured as an insert block and located between the first and second clamp ears 32, 33. Each of the first clamp ear 32 and the connecting portion 42' is formed with a pivot hole 321, 421'. The second clamp ear 33 is formed with a threaded hole 331. The fastening unit 5 is configured as a lock bolt, and extends through the pivot holes 321, 421' in the first clamp ear 32 and the connecting portion 42' to engage the threaded hole 331 in the second clamp ear 33. The accessory 4' has an end constituting the abutment portion. The end of the accessory 4' has a curved end surface 411' in contact with an annular outer surface of the inner tube 21, and a bottom surface in contact with the top end of the outer tube 22. As such, when the fastening unit 5 is loosened slightly after a period of use, rotation of the accessory 4' can be prevented.

In this embodiment, each of the first and second clamp ears 32, 33 is formed with an engaging slot 36, and the connecting portion 42' is formed with two parallel engaging ribs 43' disposed respectively at two opposite sides thereof. The engaging ribs 43' of the connecting portion 42' engage respectively the engaging slots 36 in the first and second clamp ears 32, 33 so as to further prevent rotation of the accessory 4' about the axis (L). Thus, the second preferred embodiment can also achieve the object of this invention.

Figure 11:
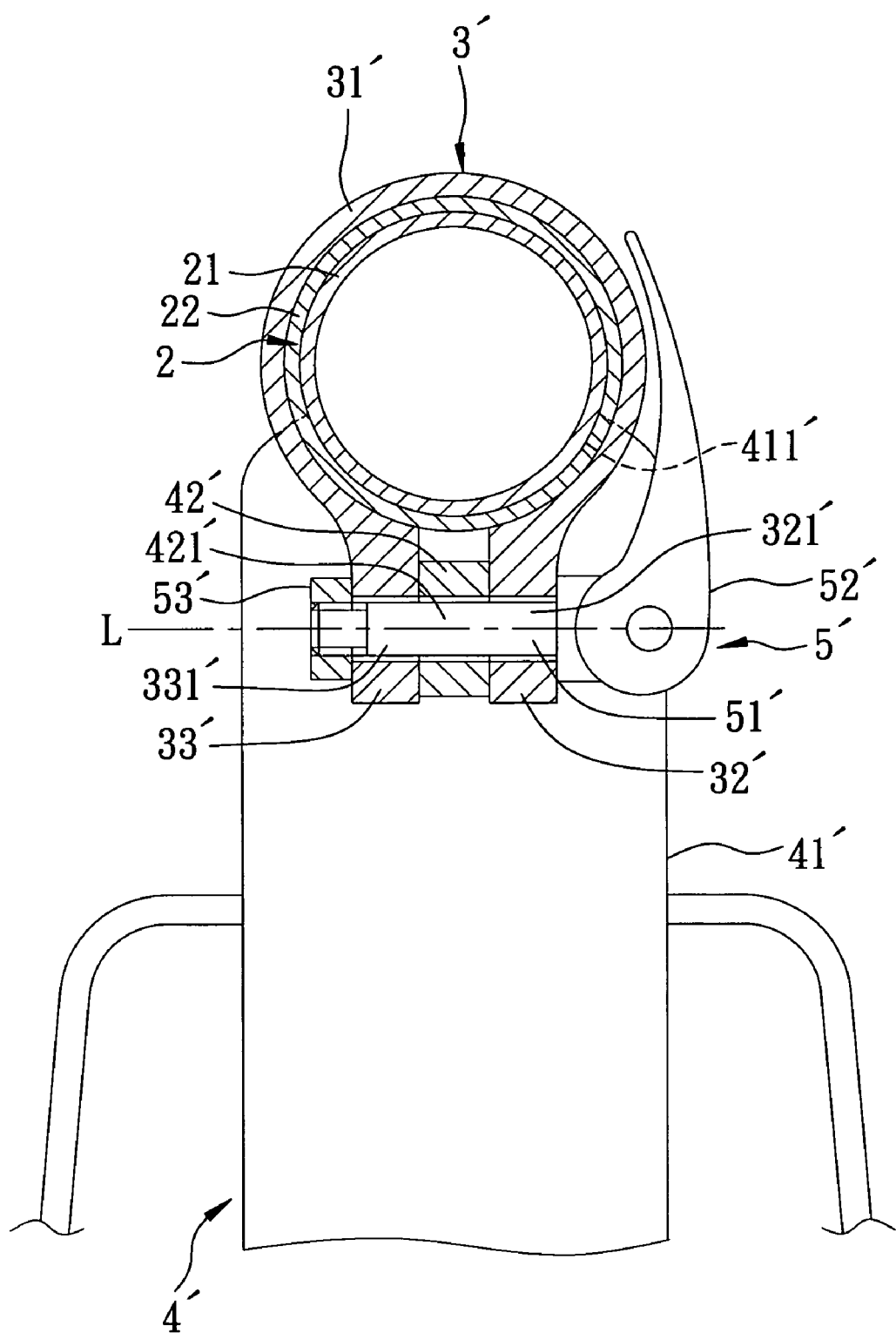
FIG. 11 is a partly sectional view of the third preferred embodiment of a bicycle accessory device according to this invention.
Figure 12:
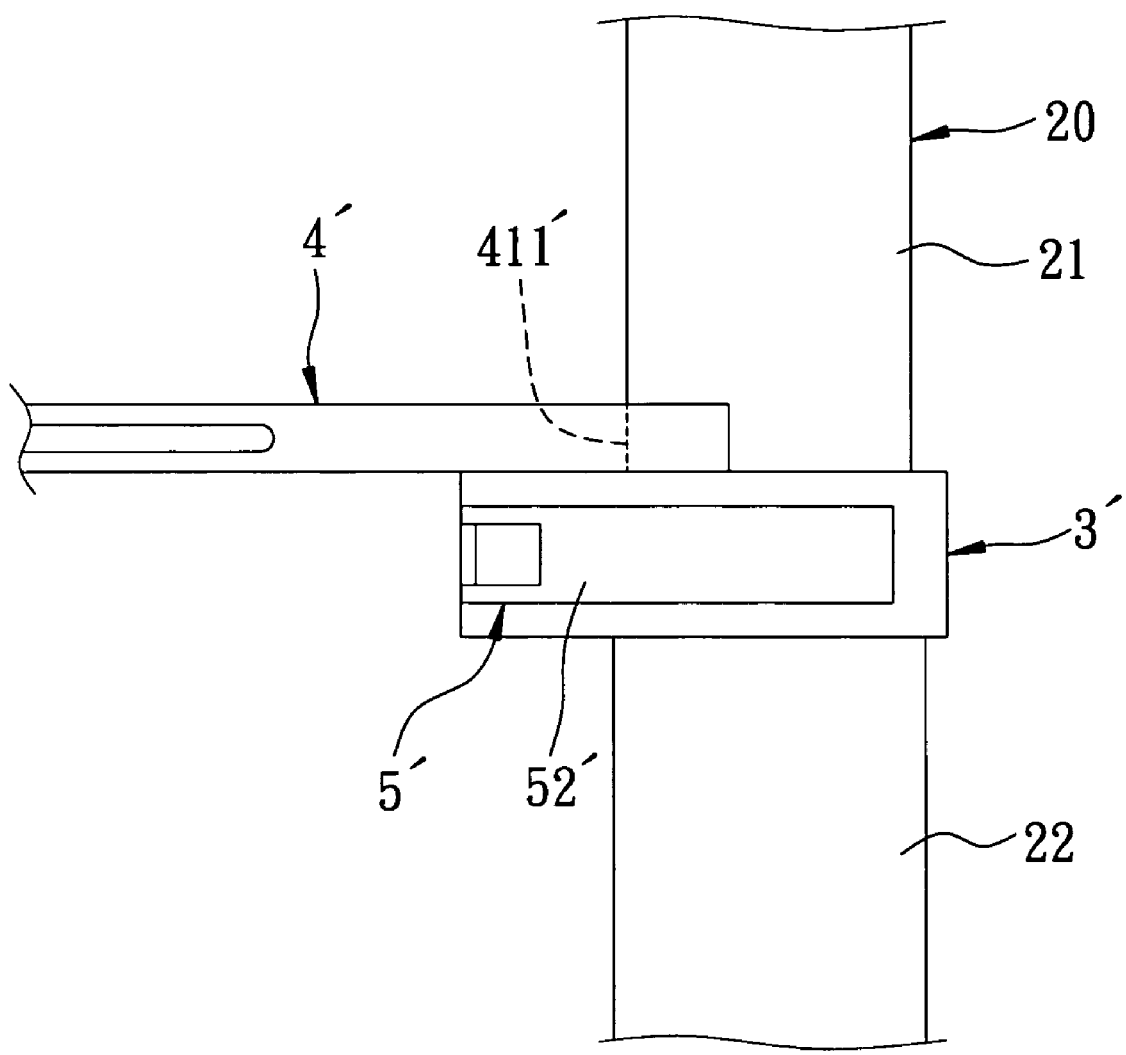
FIG. 12 is a fragmentary schematic side view of the third preferred embodiment, and the inner and outer tubes.

FIGS. 11 and 12 show the third preferred embodiment of a bicycle accessory device according to this invention, which is similar in construction to the second preferred embodiment. Unlike the second preferred embodiment, the accessory 4' and the fastening unit 5' are configured respectively as a rear carrier rack and a quick release lock unit. The connecting portion 42' is formed with a pivot hole 421'.

The fastening unit 5' includes a stud 51' extending through the pivot holes 321, 421', 331' in the first clamp ear 32, the connecting portion 42', and the second clamp ear 33', an operation lever 52' connected pivotally to one end of the stud 51', and a nut 53' engaging the other end of the stud 51'. The operation lever 52' is operable to release the clamp 3' from outer tube 22.

In this embodiment, no lock bolt is in contact with the inner and outer tubes 21, 22, and, thus, cannot damage the same.

With this invention thus explained, it is apparent that numerous modifications and variations can be made without departing from the scope and spirit of this invention. It is therefore intended that this invention be limited only as indicated by the appended claims.

I claim:

1. A bicycle accessory assembly adapted to be mounted to a bicycle frame, the bicycle frame having an inner tube and an outer tube sleeved on the inner tube, the inner tube having a top end disposed above outer tube, said bicycle accessory assembly comprising:
    a clamp including a sleeve portion adapted to be sleeved on the outer tube and having two adjacent ends, a first clamp ear connected integrally to one of said ends of said sleeve portion, and a second clamp ear connected integrally to the other of said ends of said sleeve portion;
    an accessory having a body, a connecting portion, and an abutment portion adapted to contact the inner tube and a top end of the outer tube; and
    a fastening unit extending through said connecting portion of said accessory and said first and second clamp ears along an axis so as to lock said clamp and said accessory releaseably on an assembly of the inner and outer tubes, said fastening unit being operable to move said first clamp ear toward and away from said second clamp ear, said axis being oriented such that rotation of said accessory about said axis is prevented as a result of contact between said abutment portion of said accessory and the inner and outer tubes.

2. The bicycle accessory assembly as claimed in claim 1, wherein said connecting portion has a first accessory ear and a second accessory ear, said first and second clamp ears of said clamp being located between said first and second accessory ears, each of said first clamp ear and said first accessory ear being formed with a pivot hole, each of said second clamp ear and said second accessory ear being formed with a threaded hole, said fastening unit being configures as a lock bolt and extending through said pivot holes in said first accessory ear and said first clamp ear to engage said threaded holes in said second clamp ear and said second accessory ear, said accessory being formed with a hole adapted for permitting the inner tube to extend fittingly therethrough, said hole in said accessory being defined by an annular inner peripheral portion constituting said abutment portion of said accessory.

3. The bicycle accessory assembly as claimed in claim 2, wherein said pivot hole in said first clamp ear is configured as a counterbore, and has a large-diameter hole portion and a small-diameter hole portion connected to said large-diameter hole portion and having a diameter smaller than that of said large-diameter hole portion, said lock bolt having a head disposed within said large-diameter hole portion, and a threaded stem portion extending through said small-diameter hole portion.

4. The bicycle accessory assembly as claimed in claim 3, wherein said accessory is one of a mudguard, a tail lamp, and a rear carrier rack.

5. The bicycle accessory assembly as claimed in claim 1, wherein said connecting portion of said accessory is configured as an insert block located between said first and second clamp ears, each of said first clamp ear and said insert block being formed with a pivot hole, said second clamp ear being formed with a threaded hole, said fastening unit being configured as a lock bolt extending through said pivot holes in said first clamp ear and said insert block to engage said threaded hole in said second clamp ear.

6. The bicycle accessory assembly as claimed in claim 5, wherein said accessory has an end constituting said abutment portion, said end of said accessory having a curved end surface adapted for contact with an annular outer surface of the inner tube, and a bottom surface adapted for contact with the top end of the outer tube.

7. The bicycle accessory assembly as claimed in claim 5, wherein each of said first and second clamp ears is formed with an engaging slot, said insert block being formed with two parallel engaging ribs disposed respectively at two opposite sides thereof, said engaging ribs of said inert block engaging respectively said engaging slots in said first and second clamp ears so as to further prevent rotation of said accessory about said axis.

8. The bicycle accessory assembly as claimed in claim 7, wherein said accessory is one of a mudguard, a tail lamp, and a rear carrier rack.

9. The bicycle accessory assembly as claimed in claim 1, wherein said connecting portion of said accessory is configured as an insert block located between said first and second clamp ears, each of said first and second clamp ears and said insert block being formed with a pivot hole, said fastening unit being configured as a quick release lock unit and including a stud extending through said pivot holes in said first and second clamp ears and said insert block, an operation lever connected pivotally to one end of said stud, and a nut engaging the other end of said stud, said operation lever being operable to release said clamp from the outer tube.

10. The bicycle accessory assembly as claimed in claim 1, wherein said accessory is one of a mudguard, a tail lamp, a rear carrier rack, and a tail lamp.

11. A bicycle comprising:
a bicycle frame having an inner tube and an outer tube sleeved on said inner tube, said inner tube having a top end disposed above said outer tube;
a clamp including a sleeve portion sleeved on said outer tube and having two adjacent ends, a first clamp ear connected integrally to one of said ends of said sleeve portion, and a second clamp ear connected integrally to the other of said ends of said sleeve portion;
an accessory having a body, a connecting portion, and an abutment portion in contact with said inner tube and a top end of said outer tube; and a fastening unit extending through said connecting portion of said accessory and said first and second clamp ears along an axis so as to lock said clamp and said accessory releaseably on an assembly of the inner and outer tubes, said fastening unit being operable to move said first clamp ear toward and away from said second clamp ear, said axis being oriented such that rotation of said accessory about said axis is prevented as a result of contact between said abutment portion of said accessory and said inner and outer tubes.

12. The bicycle accessory assembly as claimed in claim 11, wherein said connecting portion has a first accessory ear and a second accessory ear, said first and second clamp ears of said clamp being located between said first and second accessory ears, each of said first clamp ear and said first accessory ear being formed with a pivot hole, each of said second clamp ear and said second accessory ear being formed with a threaded hole, said fastening unit being configures as a lock bolt and extending through said pivot holes in said first accessory ear and said first clamp ear to engage said threaded holes in said second clamp ear and said second accessory ear, said accessory being formed with a hole permitting said inner tube to extend fittingly therethrough, said hole in said accessory being defined by an annular inner peripheral portion constituting said abutment portion of said accessory.

13. The bicycle as claimed in claim 12, wherein said pivot hole in said first clamp ear is configured as a counterbore, and has a large-diameter hole portion and a small-diameter hole portion connected to said large-diameter hole portion and having a diameter smaller than that of said large-diameter hole portion, said lock bolt having a head disposed within said large-diameter hole portion, and a threaded stem portion extending through said small-diameter hole portion.

14. The bicycle as claimed in claim 13, wherein said accessory is one of a mudguard, a tail lamp, a rear carrier rack, and a tail lamp.

15. The bicycle as claimed in claim 11, wherein said connecting portion of said accessory is configured as an insert block located between said first and second clamp ears, each of said first clamp ear and said insert block being formed with a pivot hole, said second clamp ear being formed with a threaded hole, said fastening unit being configured as a lock bolt extending through
said pivot holes in said first clamp ear and said insert block to engage said threaded hole in said second clamp ear.

16. The bicycle as claimed in claim 15, wherein said accessory as an end constituting said abutment portion, said end of said accessory having a curved end surface in contact with an annular outer surface of said inner tube, and a bottom surface in contact with said top end of said outer tube.

17. The bicycle as claimed in claim 15, wherein each of said first and second clamp ears is formed with an engaging slot, said insert block being formed with two parallel engaging ribs disposed respectively at two opposite sides thereof, said engaging ribs of said inert block engaging respectively said engaging slots in said first and second clamp ears so as to further prevent rotation of said accessory about said axis.

18. The bicycle as claimed in claim 17, wherein said accessory is one of a mudguard, a tail lamp, a rear carrier rack, and a tail lamp.

19. The bicycle as claimed in claim 11, wherein said connecting portion of said accessory is configured as an insert block located between said first and second clamp ears, each of said first and second clamp ears and said insert block being formed with a pivot hole, said fastening unit being configured as a quick release lock unit and including a stud extending through said pivot holes in said first and second clamp ears and said insert block, an operation lever connected pivotally to one end of said stud, and a nut engaging the other end of said stud, said operation lever being operable to release said clamp from said outer tube.

20. The bicycle as claimed in claim 11, wherein said accessory is one of a mudguard, a tail lamp, a rear carrier rack, and a tail lamp.

* * * * *